May 13, 1930.  W. S. ELLIOTT  1,758,565
TWIN STRAINER
Filed Dec. 6, 1926  3 Sheets-Sheet 1

INVENTOR
William S. Elliott
by Byrnes, Stebbins & Parmelee
his attys

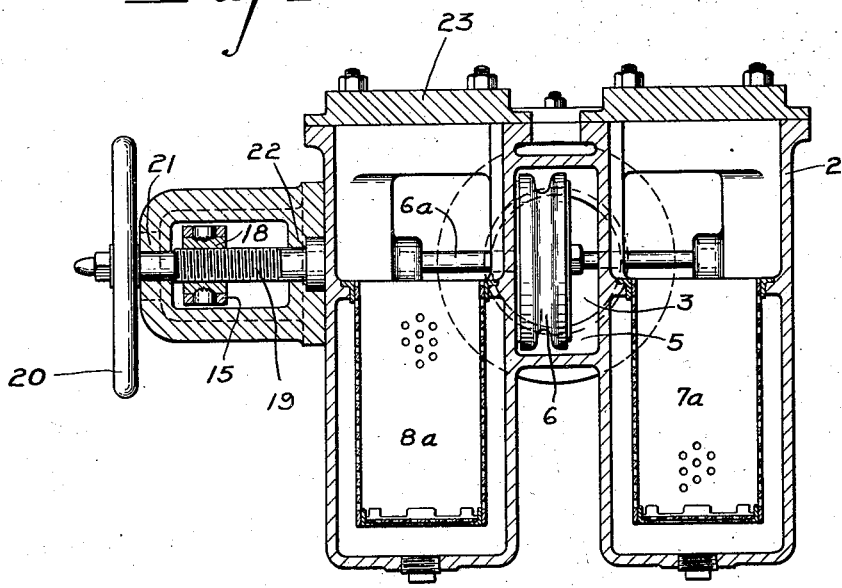
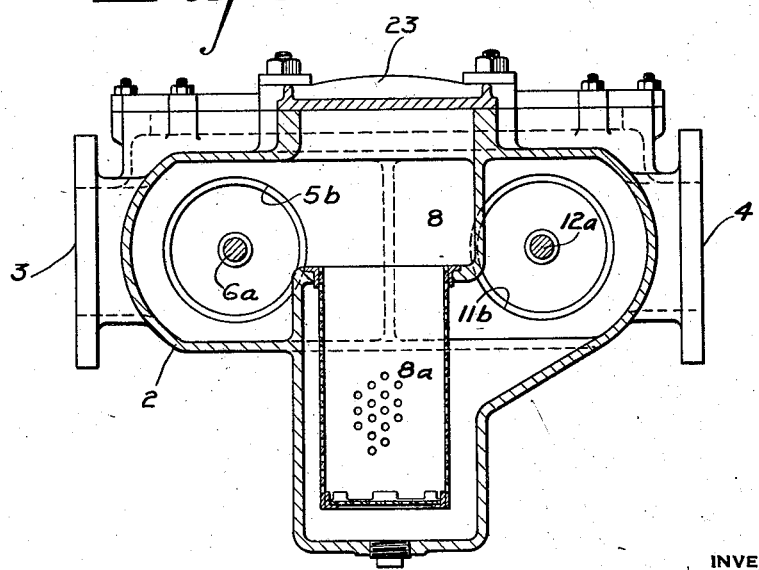

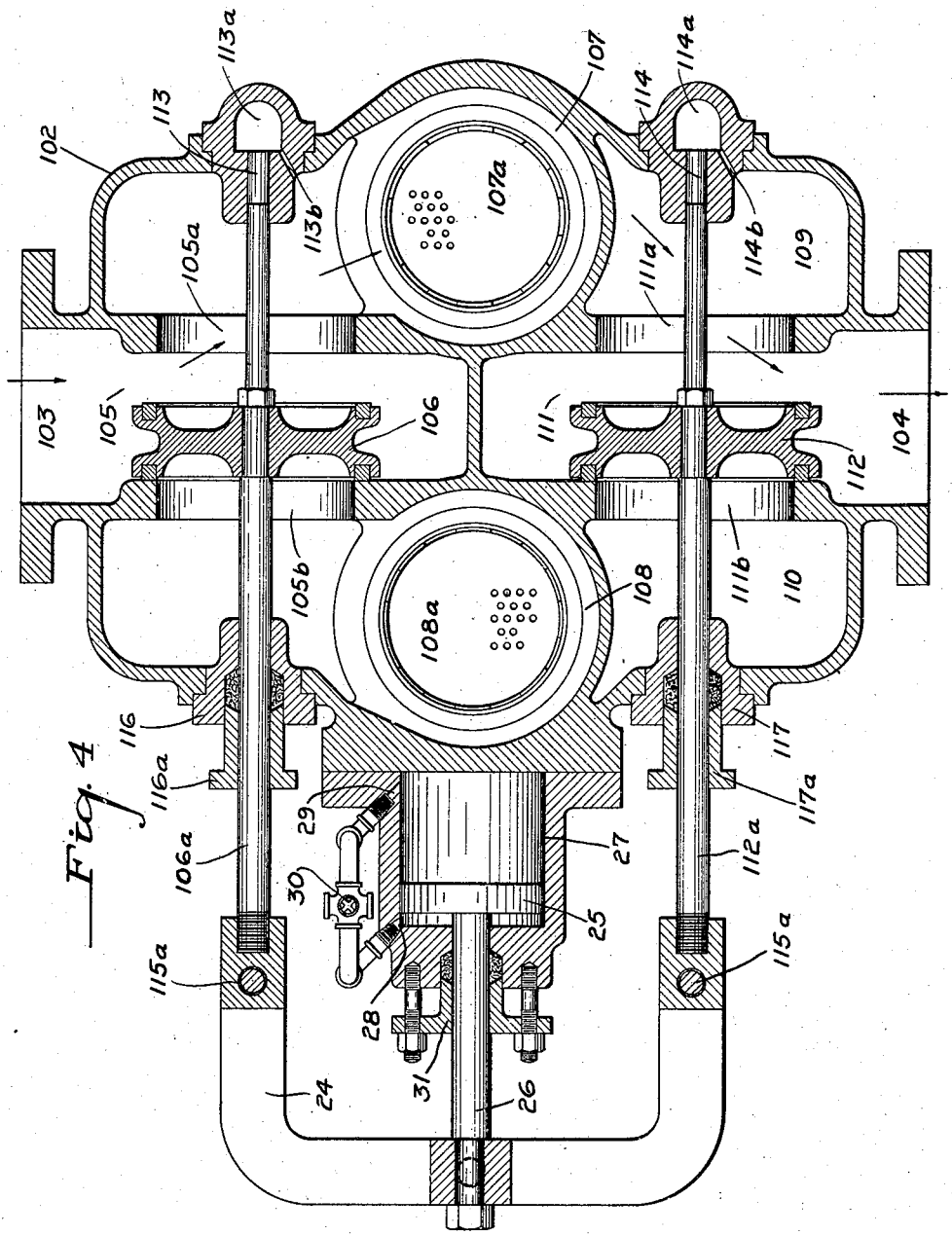

Patented May 13, 1930

1,758,565

UNITED STATES PATENT OFFICE

WILLIAM S. ELLIOTT, OF PITTSBURGH, PENNSYLVANIA

TWIN STRAINER

Application filed December 6, 1926. Serial No. 152,801.

This invention relates broadly to the art of straining liquids, and more particularly to a twin strainer adapted for straining water or other liquid.

An object of my invention is the provision of an improved valve operating mechanism whereby liquid flow may be selectively directed from one strainer to another with a minimum loss of time, and without any substantial change in the resistance offered to liquid flow.

A further object is to provide a valve operating mechanism which obviates the possibility of the liquid flow being inadvertently shut off when it is desired to alter the path of the flow.

Another object is to provide a strainer system wherein the liquid may be selectively directed through one of a plurality of strainers to the exclusion of the other strainer, or strainers, so that the strainers may be alternately cleaned.

In the accompanying drawings there are shown, for purposes of illustration only, certain preferred embodiments of the present invention, it being understood that the drawings do not define the limits of my invention, as changes in the construction and operation disclosed therein may be made without departing either from the spirit of the invention or the scope of my broader claims.

In the drawings:

Fig. 2 is a sectional view taken on the line II—II of Fig. 1;

Fig. 3 is a sectional view taken on the line III—III of Fig. 1; and

Fig. 4 is a view similar to Fig. 1, but showing a modified construction.

Figure 1:
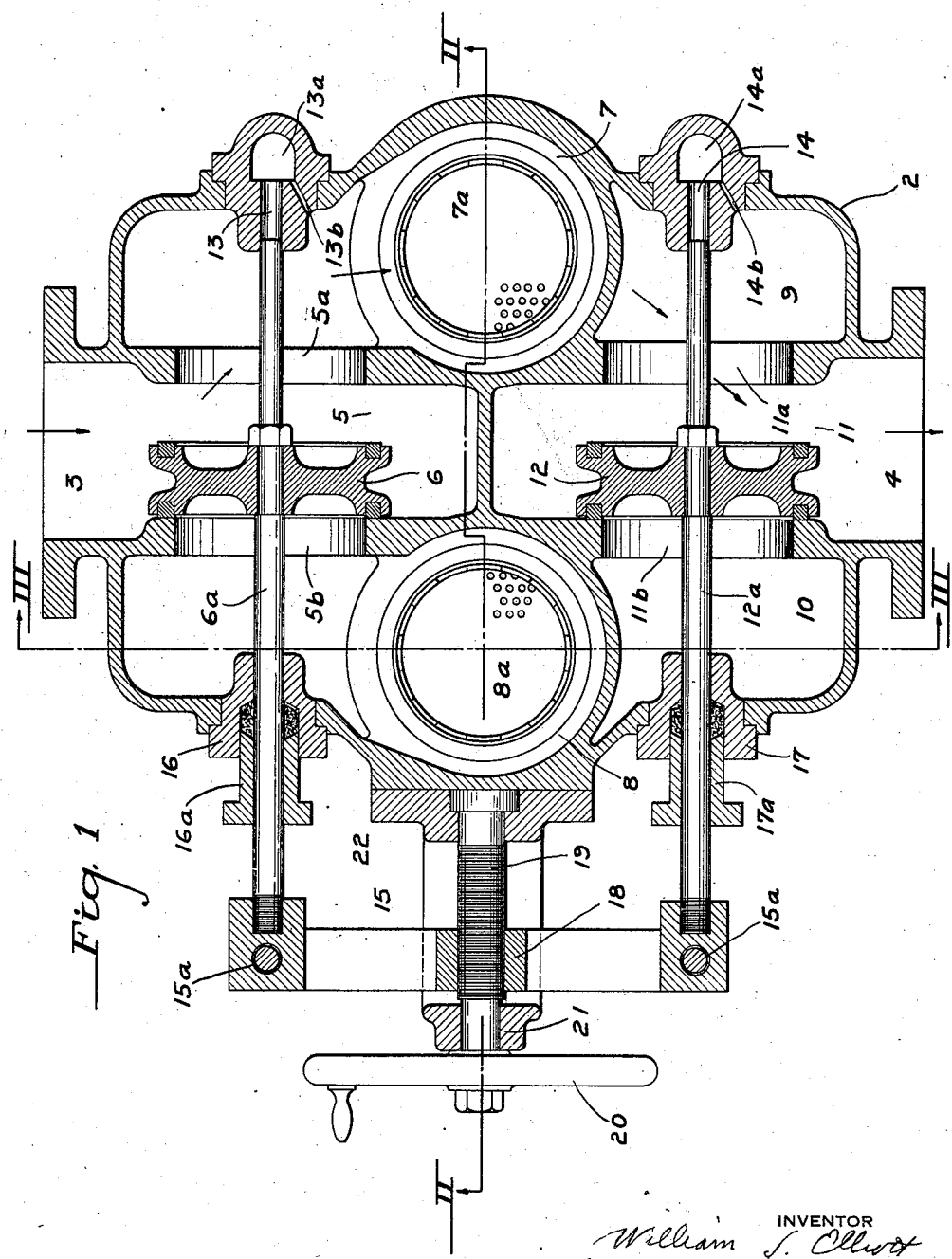
Fig. 1 is a sectional plan view of a twin strainer embodying my invention.

In accordance with the present invention, there may be constructed a twin strainer comprising a casing 2, which is preferably formed of a casting, either in one or more parts, provided with an inlet 3 and an outlet 4. Liquid may conveniently flow through the inlet 3 into a valve chamber 5 provided with ports $5^a$ and $5^b$. A double ended valve 6 in the chamber 5 may cooperate with the ports $5^a$ and $5^b$ to selectively direct the liquid flow from the chamber 5 to either of strainer chambers 7 or 8.

The chambers 7 and 8 are provided with strainers $7^a$ and $8^a$ respectively, preferably of the cylindrical basket type, so that the liquid entering the strainer chambers 7 and 8 is caused to flow into the interior of the strainer therein and outwardly therethrough, thereby leaving any sludge or other material strained from the liquid in the interior of the basket-like strainer, from which it may be removed from time to time as required.

Liquid issuing from the strainers $7^a$ and $8^a$ is conveniently directed into a chamber 9 or 10 disposed adjacent a valve chamber 11 provided with ports $11^a$ and $11^b$ similar to ports $5^a$ and $5^b$. A double ended valve 12 operating within the valve chamber 11 is adapted to cooperate with the ports $11^a$ and $11^b$ to selectively establish communication between the chambers 9 and 10 and the valve chamber 11. From the valve chamber 11 the strained liquid is led off through the outlet 4.

The valves 6 and 12 are preferably mounted on valve rods $6^a$ and $12^a$ adapted to be moved axially of the ports $5^a$ and $5^b$, and $11^a$ and $11^b$ respectively, whereby the valves 6 and 12 may be brought into operative relationship with the desired ports. The valve rods $6^a$ and $12^a$ may be conveniently mounted to slide in guide passages 13 and 14 at one end thereof, and guides 16 and 17 at the opposite end. The valve rods preferably extend through the guides 16 and 17 and are loosely inter-connected by a yoke 15 so that the valve rods and the valves associated therewith are movable bodily as a unit throughout the major portion of their travel, act independently of each other to an extent to insure seating as pointed out hereinafter. Suitable packing glands $16^a$ and $17^a$ may be provided to prevent leakage from the casing 2.

The guide passages 13 and 14 preferably communicate with relief chambers $13^a$ and $14^a$ connected by suitable bleed passages $13^b$ and $14^b$ to the interior of the casing 2, thereby permitting liquid to freely follow the valve rods as they are actuated, and preventing liquid pressure in the guide passages from opposing the motion of the valves.

The yoke 15 may be provided with a central nut portion 18 adapted to cooperate with a screw 19, the engagement between the threads of the nut portion and screw conveniently being a loose one. The screw 19 is preferably rotatable, as by a hand wheel 20, while held against longitudinal movement in suitable bearings 21 and 22. The yoke 15 is connected to the respective valve rods 6$^a$ and 12$^a$ by pins 15$^a$ having a slightly loose fit in the yoke permitting relative movement between the ports. And relative movement combined with the play permitted by the nut portion 18, as, pointed out, permits an independent movement of the valves to an extent to insure accurate seating of both in the event of any unevenness.

When it is desired to clean a strainer, say strainer 8$^a$, the valves 6 and 12 will be moved into the position shown in Fig. 1 and cap 23 covering the strainer chamber 8$^a$ may then be unbolted from the casing 2. Inasmuch as no liquid can flow into the strainer chamber 8, through the ports 5$^b$ and 11$^b$ which are then closed by the valves, the cap may be taken off and the strainer removed without leakage or interruption of the liquid flow. Obviously the liquid may be shunted through either strainer while the other is being cleaned.

Inasmuch as the valves 6 and 12 are movable bodily as a unit, there is no danger of closing ports which are not associated with the same strainer, as 5$^b$ and 11$^a$, which would result in stopping the liquid flow entirely.

As a further advantage, there is no interruption in the liquid flow while a change is being made from one strainer to another.

In Fig. 4 there is illustrated a modified form of my invention wherein the valves are moved bodily as a unit by fluid pressure actuated means. The general construction and operation is substantially the same as that set out with reference to Fig. 1, so that only the valve actuating mechanism need be described in detail. Portions of the apparatus in Fig. 4, similar to portions illustrated in Fig. 1, are designated by corresponding numerals having 100 added thereto.

In the embodiment shown (Fig. 4) there may be provided a yoke 24 connecting valve rods 106$^a$ and 112$^a$ so that the valve mechanism is movable bodily as a unit. Intermediate the valve rods, I preferably provide a fluid piston 25 secured to the yoke 24 by piston rod 26. The piston 25 is operable within a fluid pressure cylinder 27 by means of pressure fluid selectively admitted through ports 28 and 29. The path of the pressure fluid may be conveniently controlled by a 4-way valve 30 which permits one port to function as an exhaust while the other is functioning as an inlet, as is well understood in the art. The piston rod 26 is provided with a suitable packing gland 31 to prevent leakage from the cylinder 27.

When it is desired to change the flow path through this strainer, the 4-way valve is simply turned to admit pressure liquid to the proper end of the cylinder 27, whereupon the valve mechanism moves as a unit and seals one strainer chamber from the path of the liquid flow.

Certain advantages of the present invention arise from the provision of a liquid strainer adapted to permit rapid cleaning of a strainer without interruption of the liquid flow.

Further advantages arise by reason of the provision of an improved valve mechanism whereby accidental stoppage of the liquid flow is obviated, when the valves are actuated to change the path of the liquid flow.

Other advantages accrue to my invention by reason of an improved valve mechanism wherein valves working intermediate the ports may be positively maintained in accurate alignment for cooperation with the ports.

Thus I provide an improved twin strainer wherein the liquid flow may be expeditiously diverted from one strainer to another, with a minimum loss of time, without stoppage of the liquid flow, and without causing material change in the resistance offered to liquid flow.

Furthermore, my improved strainer is so devised that accidental or inadvertent stopping of the liquid flow is obviated by reason of the valves being operable simultaneously by a common valve operating means.

I claim:

1. In a twin strainer, a plurality of separate valve chambers, strainer chambers disposed on both sides of the valve chambers, said strainer chambers communicating with the valve chambers through axially aligned ports, a plurality of axially movable valves intermediate said ports, means connecting the valves to form a bodily movable unit, and operating means for actuating the valve unit to establish a desired relationship between the valves and the ports.

2. In a twin strainer, a plurality of separate valve chambers, strainer chambers disposed on each side of the valve chambers, said strainer chambers communicating with the valve chambers through axially aligned ports, a plurality of valves disposed intermediate the ports, means supporting the valves, said valve supporting means being adapted for movement axially of the ports, means connecting the valve supporting means to form a bodily movable unit, and operating means for moving the valve unit.

3. In a twin strainer, a plurality of separate valve chambers, strainer chambers disposed on each side of the valve chamber, said strainer chambers communicating with the valve chambers through axially aligned ports, valves disposed intermediate of the ports, valve supporting means, guides constraining the valve supporting means to movement axially of the ports, and means connecting the valve supporting means to form a bodily movable unit.

4. In a twin strainer, a plurality of separate valve chambers, strainer chambers disposed on each side of the valve chamber, said strainer chambers communicating with the valve chambers through axially aligned ports, valves disposed intermediate of the ports, valve supporting means, guides constraining the valve supporting means to movement axially of the ports, means connecting the valve supporting means to form a bodily movable unit, and operating means for actuating the valve unit.

5. In a twin strainer, a plurality of separate valve chambers, strainer chambers disposed on each side of the valve chamber, said strainer chambers communicating with the valve chambers through axially aligned ports, valves disposed intermediate of the ports, valve supporting means, guides constraining the valve supporting means to movement axially of the ports, means connecting the valve supporting means to form a bodily movable unit, said connecting means having a threaded portion thereon, and screw means adapted to engage the threaded portion for effecting movement of the valve unit.

6. In a twin strainer, a plurality of separate valve chambers, strainer chambers disposed on each side of the valve chamber, said strainer chambers communicating with the valve chambers through axially aligned ports, valves disposed intermediate of the ports, valve supporting means, guides constraining the valve supporting means to movement axially of the ports, means connecting the valve supporting means to form a bodily movable unit, said connecting means having a threaded portion thereon, and screw means adapted to loosely engage the threaded portion for effecting movement of the valve unit.

7. A fluid strainer of the duplex type comprising a casing having ribs dividing its interior into a plurality of chambers in two of which strainers are mounted, another of said chambers serving as an inlet to the strainers and another as an outlet from the strainers, said inlet and outlet chambers having aligned upper and lower valve seats, valves in the inlet and outlet chambers, and a common operating means connected to the valve stems for simultaneously seating the valves on either their upper or lower seats to thereby direct the flow of the fluid through one strainer and to by-pass the other.

8. Apparatus of claim 7 having a compensating device to insure proper seating of the valves.

9. In a twin strainer, a plurality of separate valve chambers, each having a plurality of axially aligned ports communicating therewith, strainer chambers connected with said valve chambers, an axially movable valve structure in each of said chambers adapted at will to control any of the ports communicating therewith to control communication between the strainer chambers and the valve chambers, and common means for simultaneously actuating said valve structure.

10. In a twin strainer, a plurality of separate valve chambers, each having a plurality of axially aligned ports communicating therewith, strainer chambers connected with said valve chambers, an axially movable valve structure in each of said chambers adapted at will to control any of the ports communicating therewith to control communication between the strainer chambers and the valve chambers, and common means for simultaneously actuating all of said valves, while permitting relative movement between said valve structure.

11. In a twin strainer, a plurality of separate valve chambers, each having a plurality of axially aligned ports communicating therewith, strainer chambers connected with said valve chambers, an axially movable valve structure in each of said chambers adapted at will to control any of the ports communicating therewith to control communication between the strainer chambers and the valve chambers, and means interconnecting the valve structure to form a bodily movable unit.

12. In a twin strainer, a plurality of separate valve chambers, each having a plurality of axially aligned ports communicating therewith, strainer chambers connected with said valve chambers, an axially movable valve structure in each of said chambers adapted at will to control any of the ports communicating therewith to control communication between the strainer chambers and the valve chambers, and means interconnecting the valve structure to form a bodily movable flexible unit.

13. In a twin strainer, a plurality of separate valve chambers, each having a plurality of axially aligned ports communicating therewith, strainer chambers connected with said valve chambers, an axially movable valve structure in each of said chambers adapted at will to control any of the ports communicating therewith to control communication between the strainer chambers and the valve chambers, means interconnecting the valve structure to form a bodily movable unit, and operating means for actuating the valve unit.

14. In a twin strainer, a plurality of separate valve chambers, each having a plurality of axially aligned ports communicating therewith, strainer chambers connected with said valve chambers, an axially movable valve structure in each of said chambers adapted at will to control any of the ports communicating therewith to control communication between the strainer chambers and the valve chambers, means interconnecting the valve structure to form a bodily movable flexible unit, and operating means for actuating the valve unit.

15. A fluid strainer of the duplex type, comprising a casing having ribs dividing its interior into a plurality of chambers in two of which strainers are mounted, another of said chambers serving as an inlet to the strainers and another as an outlet from the strainers, said inlet and outlet chambers having axially aligned upper and lower valve seats, axially movable valves in the inlet and outlet chambers, and a common operating means connected to the valves for simultaneously seating the valves on either of the axially aligned seats to thereby direct the flow of fluid through one strainer and to by-pass the other.

16. Apparatus of claim 15, having a compensating device to insure proper seating of the valves.

In testimony whereof I have hereunto set my hand.

WILLIAM S. ELLIOTT.

CERTIFICATE OF CORRECTION.

Patent No. 1,758,565. Granted May 13, 1930, to

WILLIAM S. ELLIOTT.

It is hereby certified that error appears in the printed specification of the above numbered patent requiring correction as follows: Page 3, line 86, claim 10, for the word "valves" read "valve structure", and line 88, for "valve structure" read "valves"; and that the said Letters Patent should be read with these corrections therein that the same may conform to the record of the case in the Patent Office.

Signed and sealed this 24th day of June, A. D. 1930.

(Seal)

M. J. Moore,
Acting Commissioner of Patents.